United States Patent [19]

Prewo

[11] 4,263,367
[45] Apr. 21, 1981

[54] DISCONTINUOUS GRAPHITE FIBER REINFORCED GLASS COMPOSITES

[75] Inventor: Karl M. Prewo, Vernon, Conn.

[73] Assignee: United Technologies Corporation, Hartford, Conn.

[21] Appl. No.: 92,168

[22] Filed: Nov. 7, 1979

[51] Int. Cl.³ .................... F06B 9/26; C03C 13/00
[52] U.S. Cl. .................... 428/338; 428/285; 428/297; 428/401; 428/408; 428/367; 428/389; 428/902
[58] Field of Search ............... 428/408, 367, 902, 338, 428/389, 390, 401, 268, 285, 297

[56] References Cited

U.S. PATENT DOCUMENTS

| | | | |
|---|---|---|---|
| 3,140,190 | 7/1964 | Lazzaro | 106/56 |
| 3,378,431 | 4/1968 | Smith | 106/52 |
| 3,431,970 | 3/1969 | Olstowski | 164/97 |
| 3,607,608 | 9/1971 | Siefert | 106/55 |
| 3,624,005 | 11/1971 | Godron | 252/506 |
| 3,627,551 | 12/1971 | Olstowski | 106/56 |
| 3,681,187 | 8/1972 | Bowen | 428/367 |
| 3,713,959 | 1/1973 | Rottmayer | 428/113 |
| 3,813,232 | 5/1974 | Forker | 65/23 |

OTHER PUBLICATIONS

Sambell et al., "Carbon Fibre Composites with Ceramic and Glass Matrices", *J. Mat. Science*, vol. 7, pp. 673–675 (1972).
Prewo et al., "Glass Matrix Composites-I-Fiber Reinforced Glass", *Proceedings of the 2nd Intern. Con. on Composite Mat.*, 4/1978.
Bacon et al., *Research on Graphite Reinforced Glass Matrix Composites*, NASA Contract Report 145245, Jun. 1977.
Bacon et al., *Research on Graphite Reinforced Glass Matrix Composites*, NASA Contract Report 158946, Jun. 1978.

*Primary Examiner*—Ellis P. Robinson
*Attorney, Agent, or Firm*—Harry J. Gwinnell

[57] ABSTRACT

A graphite reinforced glass composite is described comprising discontinuous graphite fibers in substantially planar orientation in a glass matrix with strength and fracture toughness greater than the unreinforced glass matrix. The resulting composite has superior strength, fluid impermeability, wear resistance, failure strain and fracture toughness. In fact, the stress-strain, curve for composites of the invention resembles that of metal making it particularly suitable for a variety of moldable shapes and machinable designs.

9 Claims, 10 Drawing Figures

DISCONTINUOUS GRAPHITE FIBER REINFORCED GLASS COMPOSITES

CROSS-REFERENCE TO RELATED APPLICATIONS

Attention is directed to U.S. patent applications Ser. Nos. 54,084 now abandoned and 54,098 of common assignee, filed July 2, 1979, directed to graphite reinforced glass composites.

BACKGROUND OF THE INVENTION

1. Field of Art

The field of art to which this invention pertains is graphite fiber reinforced glass material.

2. Description of the Prior Art

While the use of graphite reinforcement in glass composites is not new, because of the potential properties of such a combination there is an ongoing search for the right mix of materials to produce an article which will be satisfactory in properties for a large range of uses. Attempts at accomplishing this goal have included the use of various fibers in place of graphite, such as silicon carbide and aluminum oxide, and attempts at various forms of graphite fiber such as continuous and discontinuous fibers. Because of its ease of fabrication, discontinuous fiber composites have been attempted but have met with little success in the past. For example, an article by Sambell et al entitled "Carbon Fiber Composites with Ceramic and Glass Matrices" (*Journal of Materials Science*, Vol. 7, pages 663–675, 1972), teaches attempts at fabricating graphite-glass composites from discontinuous fibers. However, when Sambell et al combined their discontinuous fibers with the glass matrix the resulting product did not even have the composite strength of the unreinforced glass matrix. In a follow-up article by the same authors (*Journals of Materials Science*, Vol. 7, pages 676–681, 1972) the authors went on to use continuous fibers aligned in the matrix to achieve a high composite strength. U.S. Pat. No. 3,681,187 also demonstrates attempts to utilize discontinuous fibers in a glass matrix, and also documents the unsatisfactory results attained by such attempts. Note Table 1 of this reference. And U.S. Pat. No. 3,607,608 further demonstrates the reliance of the prior art on continuous graphite fibers to attain satisfactory strength properties.

Thus, the prior art has turned to continuous graphite fiber reinforced glass to achieve dimensional stability, high strength and stiffness. However, even acceptable graphite glass composites of the past have not provided the workability and strength characteristics desired by the industry. Furthermore, the anisotropic thermal expansion and elastic modulus of such composites have not been acceptable for many industrial uses, for example for various mirror applications. And while attempts such as differing lay-up orientation of the fiber plies has been attempted in the past, the procedure is severely limited by large residual stresses introduced into the composite during cool down from fabrication. Furthermore, there has been some evidence of channeling due to micro-cracking of aligned continuous fiber composites during processing.

BRIEF SUMMARY OF THE INVENTION

The present invention is directed to glass composites reinforced with discontinuous graphite fibers in substantially planar orientation in the composite with strength and fracture toughness greater than the unreinforced glass matrix. Such composites exhibit superior strength, failure strain, fracture toughness, fluid impermeability, wear resistance, workability, machinability, and are easier to fabricate than those of past technology.

The foregoing and other objects, features and advantages of the present invention will become more apparent from the following description of preferred embodiments and accompanying drawings.

DETAILED DESCRIPTION OF PREFERRED EMBODIMENTS

Figure 1A:
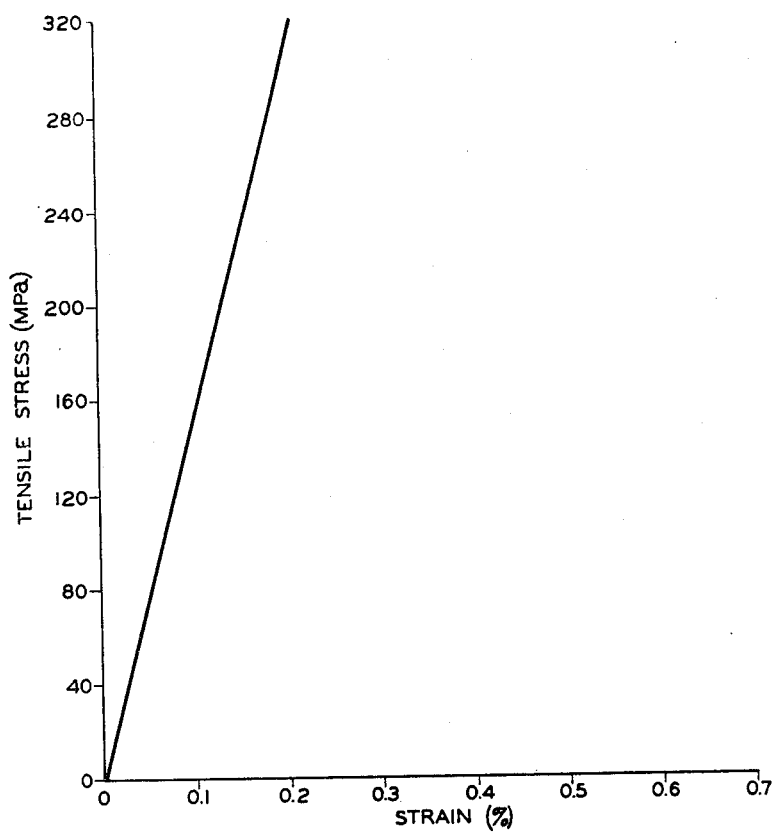
FIGS. 1A and 1B demonstrate the stress strain curves of a conventional continuous fiber composite and a discontinuous fiber composite of the present invention.

The composites of the present invention are distinguishable from discontinuous fiber composites of the prior art in their strength and fracture toughness being greater than that of the unreinforced matrix, such toughness being reflected in enhanced crack growth resistance, machinability, and an insensitivity to surface defects. For example, composites of the present invention exhibit flexural strength greater than 10,000 psi and preferably greater than 20,000 psi. Similarly, such composites exhibit fracture toughness greater than 3 $MPa/m^{3/2}$ and preferably greater than 5 $MPa/m^{3/2}$. In order to produce such superior properties, it is necessary that the graphite fiber laying take place to produce planar alignment and fibers which are too long will tend to break and tangle and fail to produce the required alignment. The graphite fibers of the present invention preferably have an average length of about 1 to about 3 cm, and most preferably about 2 cm. The improved properties of the composites of the present invention are believed to be directly attributable to this orientation factor. In order to attain the superior properties desired, graphite fibers with high strength, and high modulus of elasticity should be chosen. The preferred graphite fiber is Celion ® 6000 (Celanese Corporation). This fiber is specifically available in the planar orientation desired from International Paper Company. The fiber comes in sheet form containing about 5 to 10% by weight of polyester binder. While the composites can be made with the binder present in the fiber ply, it is preferred that the binder be removed, either by solvent washing or heating prior to composite fabrication. The fiber has an elastic modulus of about 234 GPa, an average strength of about 2760 MPa, and an average length of about 2 cm (about ¾ inch). The fiber represents about 20 to 50% by volume of the fiber plus matrix in the composite. In general, a smaller volume of fibers is achieved in the discontinuous fiber composite than the continuous fiber composites of the prior art because of the in-plane random orientation. Continuous fiber alignment allows for less matrix incursion between the fibers than does discontinuous fiber lay-up because of the tighter fiber proximity of compressed continuous fiber composites.

While the graphite paper used in the majority of samples of the present invention was isotropically laid, i.e., substantially equal numbers of fibers in-plane in every direction, the fiber laying can be favored in a particular in-plane direction in preparation of an article when it is known that such article will be receiving stress primarily in a single direction. However, to insure the improved properties of composites of the present invention such favored laying should not exceed about 90% of the total fiber laying, the fibers should be laid in-plane, and average fiber length should preferably be about 1 to about 3 cm.

The glass used should be particularly selected to have a low coefficient of thermal expansion and preferably be matched as closely as possible to that of the graphite fibers used. Particularly suitable for the properties desired in the composites of the present invention is borosilicate glass such as Corning's 7740. This particular glass has an anneal point of 560° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm°C.$\times 10^{-7}$ and a modulus of elasticity of $9.1\times 10^6$ psi. The particle size of the glass should preferably be such that at least 90% passes through a 325 mesh screen.

The composites of the present invention are preferably formed by cutting the paper to the desired composite shape followed by binder removal, for example, by solvent immersion or touching each ply to a bunsen burner flame to burn off the binder. The plies are next either dipped in a slurry of the glass or simply stacked with layers of powdered glass sufficient to substantially fill the spaces between the plies placed between each ply. The formed articles are then hot pressed at elevated temperature to form the composites. The processing parameters and composition of the material used can vary widely, depending on the ultimate use of the article. While it is not necessary to lay the plies in any particular direction, it has been found that the best strength properties appear to be obtained when each individual ply is laid up in the same direction, i.e., all plies are aligned during lay-up to keep colinear their original orientation with regard to the paper roll axis.

As can be seen from both the above processing description and the below cited example the composites of the present invention are much easier to construct than the continuous fiber type composites. The particular care required when laying continuous fibers is not necessary here. Furthermore, it is known that composites containing continuously layed fibers can develop microcracks parallel to the fiber lengths when they are compressed which can result in channeling and fluid leakage. Because of the discontinuous orientation of the fibers of the present invention this is not possible. It is also noteworthy that while continuous length graphite reinforced glass composites have tensile strain to failure values of the order of 0.1 to 0.3%, the discontinuous fiber reinforced composites of the present invention generally exhibit values in excess of 0.6%. Furthermore, the wear characteristics of the discontinuous fiber composites are excellent.

Figure 1B:
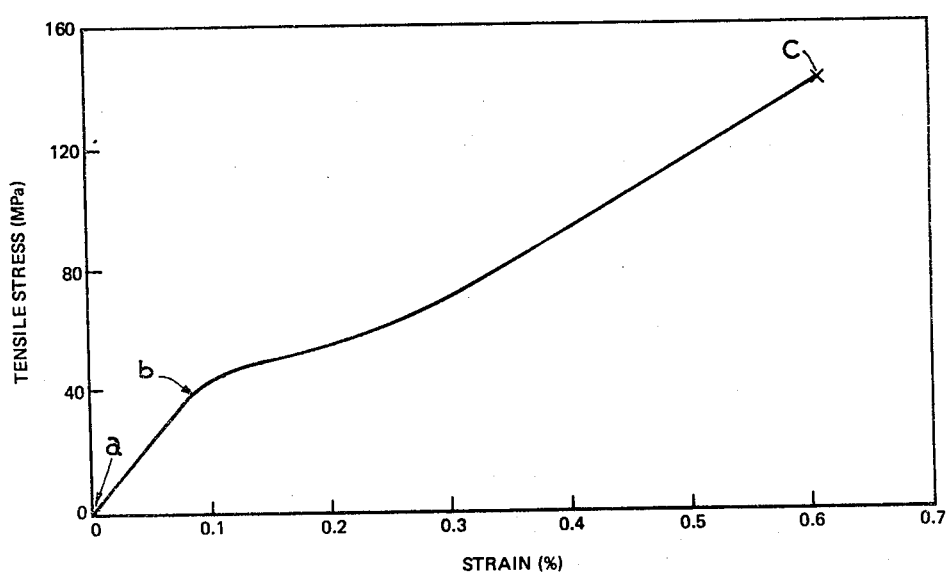

The superiority of the composites of the present invention over those of the prior art is further underscored by reference to the figures. In FIG. 1A, the tensile stress strain curve (at 22° C.) of a typical continuous fiber reinforced composite is shown. As can be seen, the curve is substantially linear with a breakpoint between 0.2 and 0.4%. FIG. 1B demonstrates a typical stress strain curve of a discontinuous fiber composite of the present invention. The shape of the curve is quite surprising for a glass composite in that it resembles that of a ductile metal. The curve of FIG. 1B has an elastic modulus between points a and b of about 48.4 GPa and an ultimate tensile strength (point C) of 142 MPa at a strain of 0.61%. In this figure, elastic deformation takes place from a point about 0 to 0.1 followed by non-elastic deformation from 0.1 to 0.6 which represents the breakpoint. In FIG. 1A the same type of curve for the continuous fiber shows a breakpoint at a much lower strain and a near-linear elastic deformation is the only deformation which takes place. This indicates the continuous fiber reinforced composites are stronger but much stiffer. The discontinuous fiber, having strength in-plane in any direction about equal, behaves more like a metal. This is truly significant for a reinforced glass composite. In most reinforced glass composites, local tensile loading with sufficient force will cause local composite fracture at a particular point at a low strain level. With a discontinuous fiber reinforced glass composite as demonstrated by FIG. 1B, the applied stress at a particular point will result in local deformation at that point and redistribution of stress to neighboring material without material fracture due to the larger strain capability of the material. As a result, there is a deformation much like that witnessed in metal deformation. In addition, these discontinuous graphite fiber reinforced glasses are found to be eminently machineable using standard carbide tools. The distribution of fibers provides a microstructure which permits small chips to be taken without large scale crack propagation. Accordingly, articles with bolt holes, threaded bolts and caps have been made. Furthermore, composites according to the present invention have been placed in molds and cap-type articles formed. And such shape molding has been found to be possible both during and after initial hot pressing. Based on such properties, in conjunction with the superior wear resistant properties of the composite material of the present invention, countless articles such as brakes and bearing material can be fabricated from the composite material. This is further demonstrated by Table I. As evidenced by Table I, the in-plane tensile strength of the composite of the present invention in addition to being superior to prior art material was the only one which could even be measured because of the brittleness of the other samples. This was also true of the fracture toughness. And the graphite glass composite according to the present invention was, other than the Macor TM (Corning Glassworks) sample, the only glass composite which could be machined. The Macor is a mica-containing material quite distinct from the articles of the present invention.

TABLE I

Comparison of Graphite Paper Reinforced 7740 Glass With Other Materials

| Material | Graphite/ Glass | Pyrex (7740) Glass | Glass-Ceramics Macor | Cervit C-101 | 9608 |
| --- | --- | --- | --- | --- | --- |
| Density (gm/cm$^3$) | 2.0 | 2.23 | 2.5 | 2.5 | 2.6 |
| In plane tensile strength (MPa) | 150 | — | — | — | — |
| In plane tensile elastic modulus (GPa) | 52 | 62 | 64 | 92 | 120 |
| In plane tensile failure strain (%) | 0.6 | — | — | — | — |
| Three-point flexural strength (MPa) | 400 | 6-60 | 103 | 55 | 140 |
| Fracture toughness (MPa/m$^{3/2}$) | 10 | — | — | — | — |
| In plane CTE ($10^{-6}$ °C.$^{-1}$) @ 25° C. | 1.7 | 3.5 | 12.3 | 0 | 4.0+ |
| Normal to plane CTE ($10^{-6}$ °C.$^{-1}$) @ 25° C. | 4.2 | 3.5 | 12.3 | 0 | 4.0+ |
| Normal to plane thermal conductivity (W/M °C.) | 1.04 | 0.97 | 1.68 | 1.68 | 3.4 |
| Machinable | yes | no | yes | no | no |

EXAMPLE

Figure 2A:
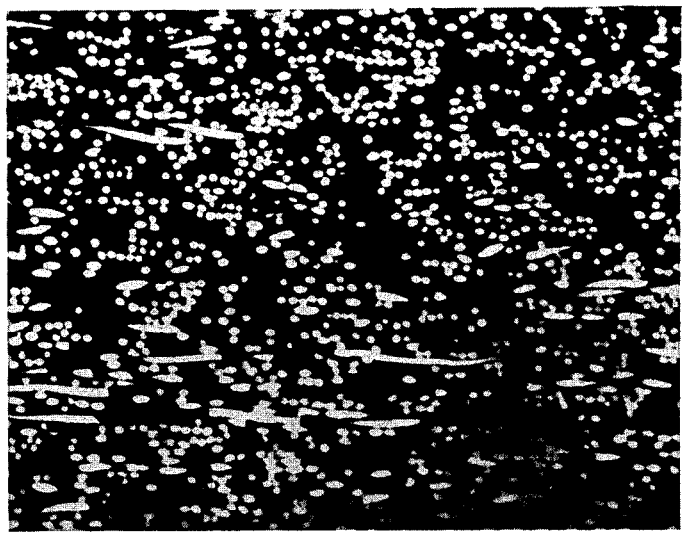
FIGS. 2A and 2B demonstrate in-plane and normal-to-plane views of improved composites of the present invention.
Figure 2B:

Celion 6000 graphite fiber paper (International Paper Company) containing about 5 to 10% by weight of a polyester binder was cut into individual pieces about 7½ cm square. The binder was removed by holding each ply over a bunsen burner flame to burn off the binder. The plies were then dipped into a slurry of Corning 7740 borosilicate glass in propanol. An exemplary slip composition comprised 40 grams of powdered glass in 780 milliliters of propanol. Preferably the glass is ground so that 90% of it passes through a 325 mesh sieve. Thus, impregnated fiber pieces can be either air dried or dried with a radiant heat source such as a heating blower to remove solvent. Similarly it is not necessary to cut the discontinuous fiber into the desired shape prior to forming the composite but it can be so formed after impregnation with the glass. The resulting impregnated papers were stacked about ten deep in a die assembly for consolidation at elevated temperature. In this particular instance all plies were aligned in the same direction during lay-up, colinear with their original orientation with regard to the paper roll axis. Hot pressing consolidation was performed at 1450° C. at a pressure of about 6.9 MPa. The resultant composites contained about 30 to 35% by volume graphite fibers, with a 1 to 3% by volume porosity, and the remainder consisting of the borosilicate glass. The finally compressed composite had a per ply thickness of about 50 microns. Thus, one layer of impregnated fiber layer for each 50 microns of thickness was used. The samples of this example were made so as to be 0.2 cm thick indicating about four layers were used. In-plane and normal-to-plane composite microstructures are shown in FIGS. 2A and 2B respectively, demonstrating the substantially planar orientation of the composites of the present invention.

Superior strength, failure strain, in-plane isotropy (for isotropically laid fibers), fluid impermeability, fracture toughness, wear resistance, workability, machineability, and ease of fabrication are key properties which distinguish composites of the present invention from those of the prior art. Three-point bend strength, four-point bend strength, tensile strength, and fracture toughness or prenotched specimen tests were performed to demonstrate the superiority of these properties in the composites of the present invention. In the three-point bend tests, the specimen tested was 7.5 cm×0.5 cm×0.2 cm and 5.5 cm×0.5 cm×0.5 cm. For the four-point bend testing samples 10 cm×0.5 cm×0.2 cm were used and for tensile strength tests 10 cm sample length×0.5 cm sample width×0.2 cm sample thickness was used. All specimens were presurface ground with a diamond abrasive wheel to remove excess surface glass resulting from fabrication, except where noted.

As can be clearly seen from Table I, not only do the graphite-glass composites of the present invention surpass other glass-ceramic materials of the prior art but they clearly surpass the properties of the matrix glass alone which, as noted in prior art section, was unattainable by the prior art. And this is accomplished at significantly less density than the glass itself. Note the density entry in Table I. The composites of the present invention are also superior in properties to commercial glass-ceramic material such as Macor, Cervit ® C-100 (Owens-Illinois Fiberglas Corp.) and Corning 9608. The in-plane tensile strength of the composite of the present invention in addition to being of significant value (150 MPa) was clearly superior to the other material compared. In fact, the other materials are traditionally considered too brittle to even register any value in the test. This was also true of the fracture toughness and failure strain, which as noted above resembled more that of metal than of glass. The elastic modulus of the composite made according to the present invention was somewhat lower than the other materials compared but certainly within an acceptable level. The three-point flexural strength far surpassed anything compared. Similarly, the coefficient of thermal expansion compared favorably with the other materials compared as did the thermal conductivity. And also quite significantly, only the graphite glass of the present invention and the Macor were machinable as discussed above.

Figure 3:
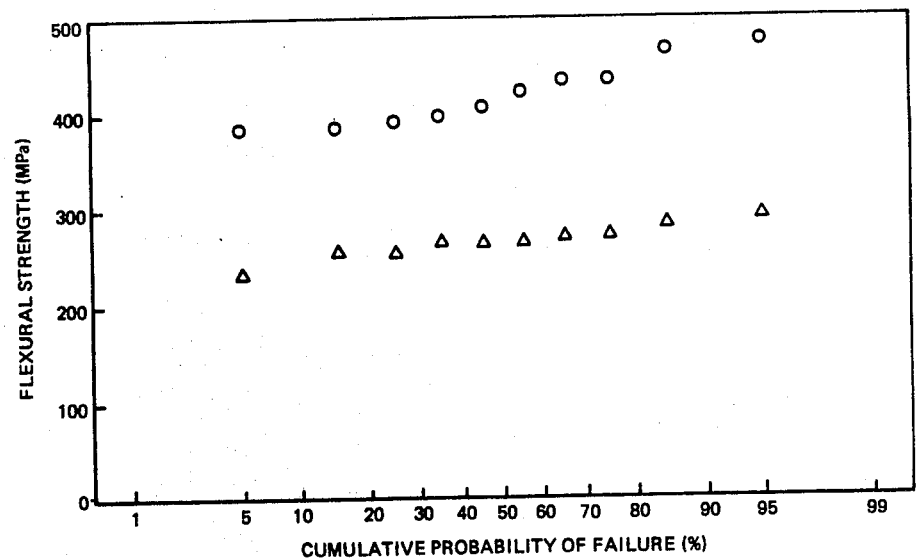
FIG. 3 shows three-point flexural strength data for composites of the present invention.
Figure 4:
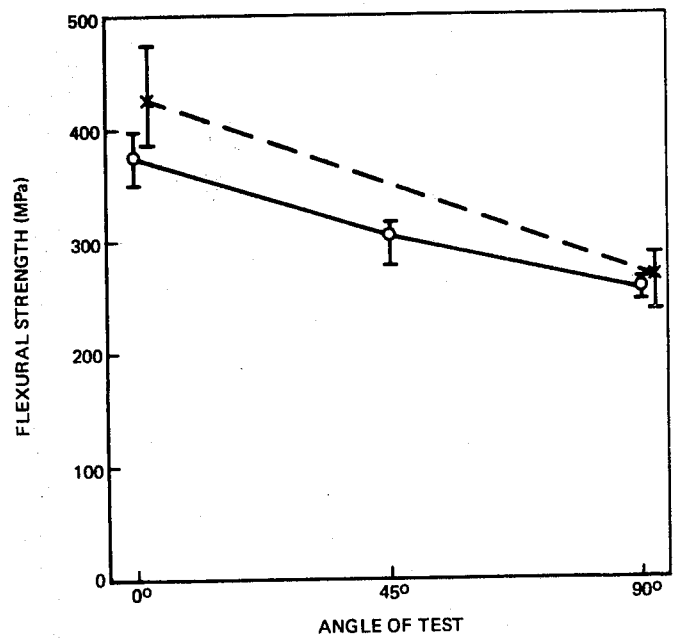
FIG. 4 shows three-point flexural strength data for composites of the present invention tested at various angles.

Reference is also made to the various figures for a further demonstration of the superiority of the composites of the present invention. In FIGS. 3 and 4 the flexural strength was tested based on orientation of the fiber lay-up. In FIG. 3, three-point flexural strength populations are shown for orientations parallel to the length of the paper roll (O) and ply lay-up perpendicular to the length of the paper roll (Δ). The testing was done for both FIGS. 3 and 4 at 22° C. and L/h=25, (where L=test instrument span and h=sample thickness). From the points on the graph for the O entries the mean strength was 420 MPa with a standard deviation of 32 MPa, and for the Δ entries the mean strength was 265 MPa with a standard deviation of 14 MPa. Similar curves for other conventional glass-ceramics would be much steeper. The points on this graph resemble more that expected of a metal. While alignment parallel to the length of the graphite paper roll provided the stronger material as shown by FIG. 3, alignment perpendicular to this alignment also provided a product with good strength properties. However, in both cases, the strength distributions are quite narrow. This is even more dramatically shown by FIG. 4 where specimens were varied from parallel and perpendicular to the roll length to a designation in between (45°). Two runs were made indicated as o and x respectively.

Figure 5:
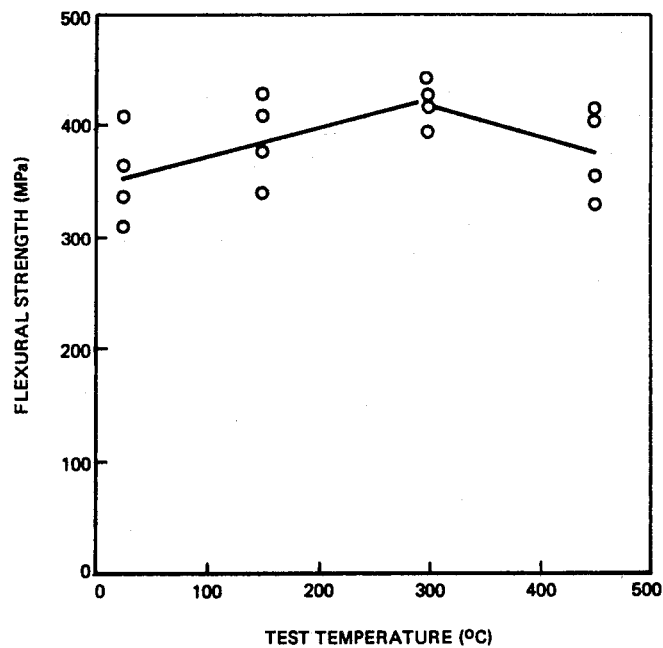
FIG. 5 shows three-point flexural strength of composites of the present invention as a function of temperature.

Flexural strength of composites of the present invention is also found to be relatively insensitive to test temperature as demonstrated by FIG. 5. In this Figure "0°" orientation specimens (alignment parallel to roll length) were tested in air from 22° to 450° C. (L/h=30) without significant alteration in composite performance or failure mode.

Figure 6:
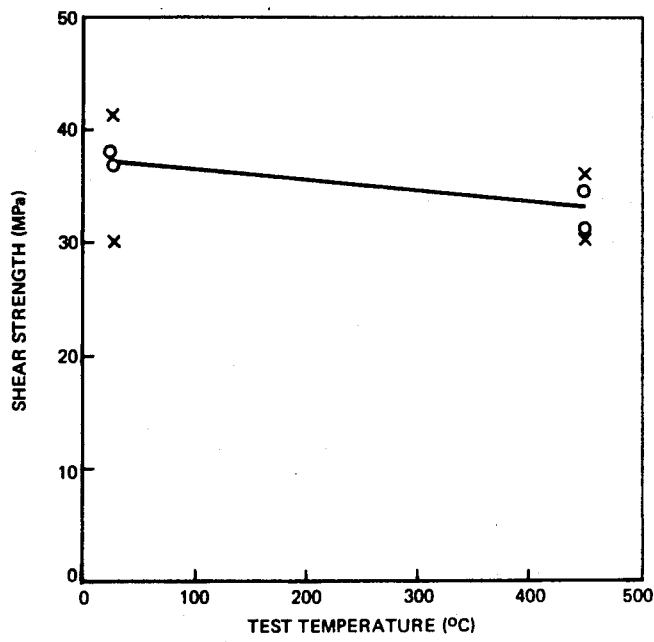
FIG. 6 shows three-point shear strength of composites of the present invention as a function of test temperature.

Three-point bend shear strength as a function of temperature is demonstrated in FIG. 6. This strength was also found to be substantially independent of temperature as well as test orientation. The fact that interlaminar shear did not occur more readily in flatwise oriented specimens as compared to edgewise oriented specimens, is an indication that the specimens do not fail in pure shear. In the Figure, x indicates edgewise testing, o flatwise testing. Testing was performed at L/h=5.5.

Figure 7:
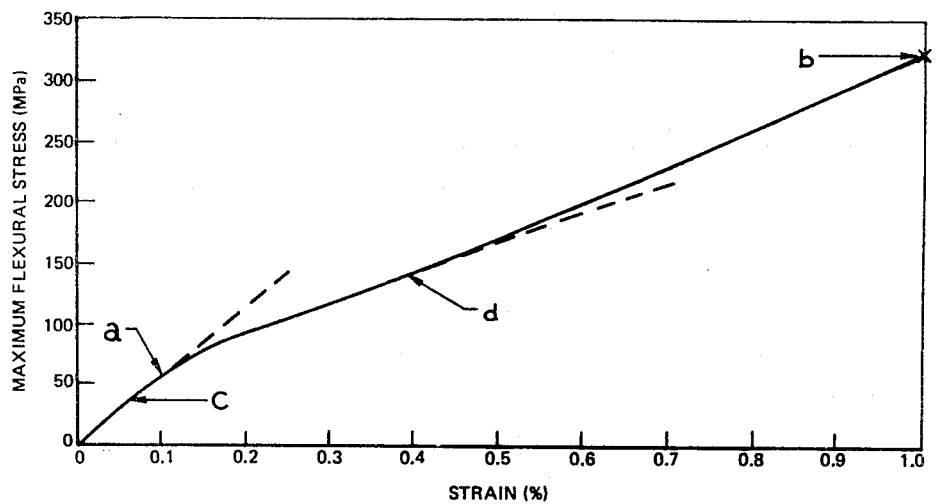
FIGS. 7 and 8 show four-point bend stress-strain behavior of composites of the present invention.
Figure 8:
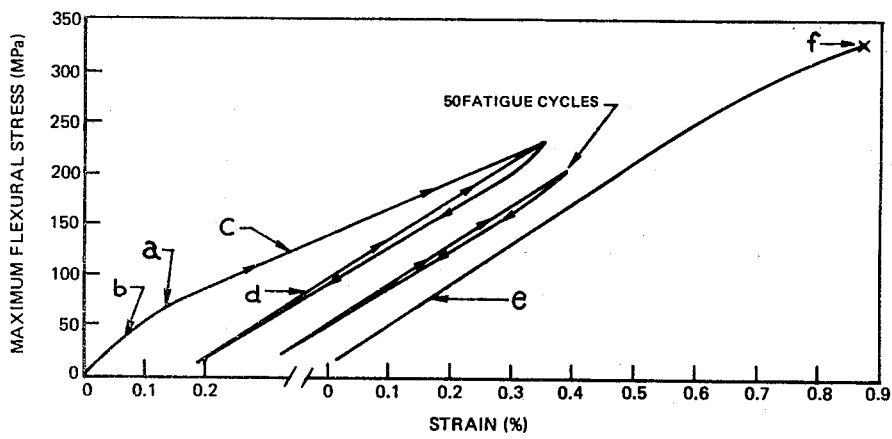

In FIG. 7, four-point bend stress versus strain behavior was measured by placing strain gages on both the tension and compression sides of the specimens. From the shape of the curve, it is theorized that initial stress strain behavior is elastic up to stress point a (63.4 MPa) at which the matrix begins cracking. This cracking is opposed by the pullout of fibers from the surrounding matrix. Final composite fracture occurs after extensive cracking and pullout at a strain level far exceeding that of the unreinforced matrix alone. The data obtained from the testing of 12 four-point bend specimens are presented in Table II. It should be noted that the last four samples had about the same strength as the preceding samples indicating that within limits the composites of the present invention were not susceptible to fatigue. Specimens with as-fabricated (glass rich) surfaces and specimens with machined (diamond abrasive ground) surfaces were found to provide very similar data. In FIG. 7 the sample showed an ultimate tensile strength of 326 MPa and failure strain of 1% (b). The modulus of elasticity (c) of the sample was 57.4 GPa up to the stress point (a) and 27.6 GPa (d) from that point (a) up to failure (b). The testing was done at 22° C. and the sample was 0.2 cm thick. The sample was tested at a major span of 8.9 cm and a minor span of 2.5 cm. The overall average four-point flexural strength of the specimens tested is 319 MPa as compared to an average three-point flexural strength of 357 MPa for specimens taken from the same panels. A typical maximum tensile stress versus strain history obtained during the testing of a particular specimen is shown in FIG. 8. This Figure demonstrates stress versus srain behavior prior to and after 50 cycles of four-point bend testing. The specimen was loaded to a surface stress well beyond the first signs of matrix cracking and then unloaded and reloaded to display the level of elastic modulus retained. The new modulus was found to be 73% of the initial specimen modulus even after the specimen had been loaded to a strain of 0.75% prior to unloading. Fatigue was carried on for fifty cycles between 205 MPa and 25 MPa followed by final bend testing to measure composite residual strength. The average value of residual strength is 307 MPa which corresponds to 96% of the average for all unfatigued specimens. It is interesting to note from this Figure that not only is the strength of the material tested about the same even after fatiguing, but the material continues to have substantially the same elastic modulus as well. It should also be noted from the graph that initial cracking began at point a (54.5 MPa) and the curve had an elastic modulus (b) of 55.1 GPa up to that point. The elastic modulus (c) was 27.6 GPa from that point on. As stated above, the elastic modulus d and e remain the same with continued cycling, with d and e equal to 40.5. As seen from the graph, the sample had an ultimate tensile strength of 327 MPa and total failure strain (f) of 1.05%.

TABLE II

Four-Point Bend Data at 22° C.*
(major span = 8.9 cm, minor span = 2.5 cm)

| Specimen | Surface Condition | h (cm) | Flex Strength (MPa) | Elastic Modulus** (GPa) | Failure Strain** % |
|---|---|---|---|---|---|
| 548-1 | Ground | 0.2 | 337 | 54.7 | — |
| -2 | Ground | 0.2 | 306 | 54.2 | 0.98 |
| -3 | Ground | 0.2 | 292 | 49.6 | 1.05 |
| -4 | Ground | 0.2 | 331 | 51.4 | 1.11 |
| -9 | As Fabricated | 0.25 | 333 | 58.7 | — |
| -10 | As Fabricated | 0.25 | 321 | 51.3 | — |
| -11 | As Fabricated | 0.25 | 309 | 59.3 | 0.94 |
| -12 | As Fabricated | 0.25 | 326 | 57.4 | 0.98 |
| -5*** | Ground | 0.2 | 309 | — | — |
| -6*** | Ground | 0.2 | 276 | — | — |
| -7*** | Ground | 0.2 | 318 | — | — |
| -8*** | Ground | 0.2 | 327 | — | 1.05 |

*Three point flexural strength values of 335 MPa, 351 MPa, 372 MPa, 371 MPa.
**Measured by strain gauge on tension side.
***After 50 tension-tension fatigue cycles between 205 MPa and 25 MPa.

The axial tension testing of strain gaged specimens resulted in the data presented in Table III and the general stress versus strain curve characteristics of FIG. 2. The tensile strength is significantly less than either four-point or three-point bend data. However, the same general features of the stress versus strain curves are retained. After a portion of initial elastic loading, a region of hardening is followed by fracture. Although the ultimate tensile strength is only 47% of the average four-point bend flexural strength, the tensile stress at which initial deviation from elastic linearity occurs is 70% of that measured in four-point bending. This relates to the fact that the probable major cause of higher four-point flexural strength can be related to nonlinear deformation of the sample during bending. The maximum flexural stress is calculated on the basis of linear elastic theory which does not apply to the sample (in the form of a small beam of material) once the tensile surface has experienced matrix cracking.

TABLE III

22° C. Tensile Test Data**

| Condition | Tensile Strength (MPa) | Elastic Modulus (GPa) | Failure Strain (%) |
|---|---|---|---|
| As Fabricated | 157 | 55 | 0.65 |
| As Fabricated | 142 | 48 | 0.61 |
| After Fatigue* | 138 | 53 | 0.59 |
| After Fatigue* | 130 | 55 | 0.58 |

*10 cycles of tension-tension fatigue between 14 MPa and 100 MPa.
**the average three-point bend flexural strength obtained from five specimens from the same panel is 433 MPa.

In thermal cycling and thermal exposure tests the composites of the present invention did not perform as well as their continuous fiber counterparts. However, this was not unexpected since fiber oxidation occurs most rapidly along the axis of the fibers within the glass. And for the current in-plane random array of fibers, this permits very rapid oxidation from the cut specimen sides inward along the paths in the fiber planes while in the case of a continuous fiber these paths were only available from the specimen ends and not the sides. However, this disadvantage can be overcome by insuring that the fiber ends are glass enclosed when the composites are formed. In test samples where all protective glass surface layers were removed to expose the graphite fibers, after 500 cycles at 22°-430° C. with heat up, hold and cool down phases of 4 minutes a piece, 38% of the composite strength was lost. Similarly, static exposure of similarly prepared and fiber exposed specimens in air at 100 hours at 430° C. caused an 80% reduction in strength.

Prenotched three-point bend specimens were tested at 22° C. and 450° C. and the results are tabulated in Table IV. In the table, h indicates the thickness of the sample, C the original notch length and $K_c$ the measured fracture toughness. The specimens were also oriented in the edgewise condition so that crack propagation occurred in a direction parallel to the planes of the graphite paper. Composite fracture by crack propagation occurred at the same value of applied load for both high and low temperatures tested. Fracture toughness values calculated using these maximum loads resulted in a stress intensity value of approximately 9-11 MPa/m$^{3/2}$. Specimens tested in the flatwise orientation failed in a different manner with extensive interlaminar cracking occurring at the base of the machined notch. This mode was more prominent in these notched specimens than in previously tested unnotched specimens with an L/h ratio of 5.5. This is probably due to the introduction of high levels of tensile stress normal to the ply plane as well as shear at the notched root which enhances the tendency for interply separation.

TABLE IV

Three-Point Bend of Prenotched Specimens*

| Test Temperature (°C.) | Orientation | h (cm) | c (cm) | $K_c$ MPa/m$^{3/2}$ | Failure Mode |
|---|---|---|---|---|---|
| 22 | Edgewise | 1.0 | 0.2 | 11.0 | Crack |
| 22 | Edgewise | 1.0 | 0.2 | 11.2 | Crack |
| 450 | Edgewise | 1.0 | 0.2 | 10.4 | Crack |
| 22 | Edgewise | 0.5 | 0.2 | 8.7 | Crack |
| 22 | Edgewise | 0.5 | 0.2 | 8.8 | Crack |
| 22 | Flatwise | 0.5 | 0.2 | 7.7 | Shear |
| 22 | Flatwise | 0.5 | 0.2 | 8.5 | Shear |

*test span (L) of 5 cm.

The fracture plane characteristics of an edgewise oriented specimen tested at 22° C. was also observed. Extensive fiber pullout from the surrounding matrix was observed over the entire fracture plane. It is this mechanism for bridging matrix cracks and retarding further crack extension which induces the surprising level of toughness in this brittle matrix-brittle fiber system.

Thermal expansion of the composites of the present invention was linear over a temperature range of 22°-300° C. with values of coefficient of thermal expansion equal to $1.7 \times 10^{-6}$ °C.$^{-1}$ in the plane and $3.9-4.5 \times 10^{-6}$ °C.$^{-1}$ normal to the plane. The thermal conductivity was measured only in the direction normal to the plane and its value at a measured temperature of 55° C. was 1.04 watts m$^{-1}$ °C.$^{-1}$ (0.60 Btu ft. hr.$^{-1}$ ft.$^{-2}$ °F.$^{-1}$). The inplane thermal conductivity although not measured would be expected to be larger than this value because of the longer path length of the graphite in all inplane directions.

Further test data is demonstrated by Table V. All specimens were surface ground prior to testing with 150 grit diamond abrasive wheel. As a point of comparison, the strength of an unreinforced glass specimen can be expected to be between 1,000 and 10,000 psi. Thus, a three to four-fold increase in composite strength was achieved over that of the unreinforced matrix by the use of the planar oriented graphite of the average length disclosed. As a basis of comparison, three-dimensional oriented fibers (of shorter average length) were also tested in composites (indicated as "felt" in Table V). The only change was that this felt was graphitized at 2000° C. prior to infiltration with the glass to assure the fully graphitic nature of the fibers within the felt. As seen by Table V, the composite strength is clearly inferior to those obtained with the two-dimensional orientation-longer fiber composites of the present invention. $CTE_1$ in the table indicates the coefficient of thermal expansion in the plane of the composite and $CTE_3$ indicates the coefficient of thermal expansion through the thickness of the composite.

TABLE V

Borosilicate Glass Matrix Composites

| Composite Number | 394B | 401 | 421 | 400 | 405 | 411 |
|---|---|---|---|---|---|---|
| Fiber Form | Paper | Paper | Paper | Felt | Felt | Felt |
| Composite Density (gm/cc) | 2.1 | 2.0 | — | — | — | — |
| Vol. % Fiber | — | 28 | 30 | 28 | 40 | 41 |
| Vol. % Glass | — | 67 | 65 | 72 | 59 | 59 |
| Vol. % Porosity | — | 5 | 5 | 0 | 1 | 0 |
| Comments | — | Porous | Less Porous | No Pores | Slight Pores | — |
| Flex Strength (10$^3$ psi) | 38 | 32 | 41 | 12.2 | 11.2 | 10.5 |
| (MPa) | 262 | 220 | 282 | 84.0 | 77.2 | 72.3 |
| $CTE_1$ (10$^{-6}$/°C.) | — | 1.9 | — | 1.8 | | |
| $CTE_3$ (10$^{-6}$/°C.) | — | 4.4 | | 4.0 | | |

Accordingly, what has been accomplished by the present invention is a graphite reinforced glass with superior strength, failure strain, fluid impermeability and fracture toughness over composites of the prior art. This along with the ease of fabrication represents a significant advance in graphite glass composites. This is surprisingly so in view of the extreme brittle nature of the starting materials.

Although this invention has been shown and described with respect to a preferred embodiment, it will be understood by those skilled in this art that various changes in form and detail thereof may be made without departing from the spirit and scope of the claimed invention.

Having thus described a typical embodiment of my invention, that which I claim as new and desire to secure by Letters Patent of the United States is:

1. A graphite fiber reinforced glass composite comprising high strength and high modulus of elasticity discontinuous graphite fibers laid up in substantially in-plane random orientation in a glass matrix so as to produce strength and fracture toughness properties greater than that of the glass matrix.

2. The composite of claim 1 having a flexural strength greater than 10,000 psi.

3. The composite of claim 2 having a flexural strength greater than 20,000 psi.

4. The composite of claim 1 having a fracture toughness greater than 3 MPa/m$^{3/2}$.

5. The composite of claim 4 having a fracture toughness greater than 5 MPa/m$^{3/2}$.

6. The composite of claim 1 wherein the glass matrix is borosilicate glass.

7. The composite of claim 1 wherein the graphite fiber is present in an amount about 30% to about 50% by volume.

8. A graphite fiber reinforced glass composite comprising about 20% to about 50% by volume high strength, high modulus of elasticity graphite fibers having an average length of about 1 cm to about 3 cm laid up in substantially in-plane random orientation in a low coefficient of thermal expansion glass matrix producing a composite with flexural strength and fracture toughness properties greater than the glass matrix.

9. The composite of claim 8 wherein the glass matrix is borosilicate glass, the average length of the fiber is about 2 cm, and the fiber is present in an amount about 30% to about 35% by volume.

* * * * *